United States Patent
Tonegawa

(10) Patent No.: US 7,596,580 B2
(45) Date of Patent: Sep. 29, 2009

(54) DOCUMENT MANAGEMENT APPARATUS

(75) Inventor: Nobuyuki Tonegawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 563 days.

(21) Appl. No.: 10/933,283

(22) Filed: Sep. 3, 2004

(65) Prior Publication Data

US 2005/0068576 A1 Mar. 31, 2005

(30) Foreign Application Priority Data

Sep. 9, 2003 (JP) .............................. 2003-317437

(51) Int. Cl.
*G06F 7/00* (2006.01)
(52) U.S. Cl. ............................. 707/104.1; 707/2; 707/8; 358/1.15; 358/403; 358/407
(58) Field of Classification Search .................. 707/104
See application file for complete search history.

(56) References Cited

U.S. PATENT DOCUMENTS

| | | | | |
|---|---|---|---|---|
| 5,905,783 | A | 5/1999 | Tonegawa | 379/100.07 |
| 5,911,776 | A * | 6/1999 | Guck | 709/217 |
| 6,460,069 | B1 * | 10/2002 | Berlin et al. | 709/201 |
| 6,763,226 | B1 * | 7/2004 | McZeal, Jr. | 455/90.2 |
| 6,825,955 | B1 * | 11/2004 | Shibata | 358/402 |
| 7,092,945 | B2 * | 8/2006 | Hall et al. | 707/10 |
| 2001/0034845 | A1 * | 10/2001 | Brunt et al. | 713/201 |
| 2001/0054076 | A1 | 12/2001 | Tonegawa | 709/206 |
| 2001/0054106 | A1 * | 12/2001 | Anderson et al. | 709/227 |
| 2002/0099778 | A1 * | 7/2002 | Kogure et al. | 709/206 |
| 2002/0165800 | A1 * | 11/2002 | Ogura et al. | 705/27 |
| 2003/0034399 | A1 * | 2/2003 | Wilz et al. | 235/462.45 |
| 2003/0093490 | A1 * | 5/2003 | Yamamoto et al. | 709/213 |
| 2005/0036681 | A1 * | 2/2005 | Lenoir | 382/176 |
| 2006/0061821 | A1 * | 3/2006 | Maeda | 358/1.15 |
| 2006/0203286 | A1 * | 9/2006 | Yoshino | 358/1.15 |

OTHER PUBLICATIONS

A fax—http://encarta.msn.com/dictionary_/fax.html Jan. 14, 2008.*
Electronic Mail—http://encarta.msn.com/encnet/refpages/search.aspx?q=electronic+mail Jan. 14, 2008.*

* cited by examiner

Primary Examiner—Kuen S Lu
Assistant Examiner—Binh V Ho
(74) Attorney, Agent, or Firm—Fitzpatrick, Cella, Harper & Scinto

(57) ABSTRACT

This invention provides an apparatus which can manage both application data and image data in a database, and transmit application data reusable by a computer. In this invention, both application data and image data which is created from the application data and formed from pages are registered in a database in accordance with database registration information. The database registration information and image data are composited to create and print a distribution material. The database registration information is extracted and reproduced from the distribution material in accordance with the contents of a transmission instruction. The database is searched by using the reproduced database registration information, and data is transmitted.

7 Claims, 18 Drawing Sheets

FIG. 8

THE SLEREXE COMPANY LIMITED
SAPORS LANE . BOOLE . DORSET . BH 25 8 ER
TELEPHONE BOOLE (945 13) S1617 . TELEX 123456

Our Ref. 350/PJC/EAC          18th January, 1972.

Dr . P. N. Cundall,
Mining Surveys Ltd.,
Holroyd Road,
Reading,
Berks.

Dear Pete,

Permit me to introduce you to the facility of facsimile transmission.

In facsimile a photocell is caused to perform a raster scan over the subject copy. The variations of print density on the document cause the photocell to generate an analogous electrical video signal. This signal is used to modulate a carrier, which is transmitted to a remote destination over a radio or cable communications link.

At the remote terminal, demodulation reconstructs the video signal, which is used to modulate the density of print produced by a printing device. This device is scanning in a raster scan synchronized with that at the transmitting terminal. As a result, a facsimile copy of the subject document is produced.

Probably you have uses for this facility in your organisation.

Yours sincerely,

*Phil.*

P. J. CROSS
Group Leader - Facsimile Research

FIG. 17

THE SLEREXE COMPANY LIMITED
SAPORS LANE . BOOLE . DORSET . BH 25 8 ER
TELEPHONE BOOLE (945 13) S1617 . TELEX 123456

Our Ref. 350/PJC/EAC  18th January, 1972.

Dr . P. N. Cundall,
Mining Surveys Ltd.,
Holroyd Road,
Reading,
Berks.

Dear Pete,

Permit me to introduce you to the facility of facsimile transmission.

In facsimile a photocell is caused to perform a raster scan over the subject copy. The variations of print density on the document cause the photocell to generate an analogous electrical video signal. This signal is used to modulate a carrier, which is transmitted to a remote destination over a radio or cable communications link.

At the remote terminal, demodulation reconstructs the video signal, which is used to modulate the density of print produced by a printing device. This device is scanning in a raster scan synchronized with that at the transmitting terminal. As a result, a facsimile copy of the subject document is produced.

Probably you have uses for this facility in your organisation.

Yours sincerely,

*Phil.*

P. J. CROSS
Group Leader - Facsimile Research

PC_COPY. abc. co. jp/DB/001

FIG. 18

| | DATA | CHARACTER STRING |
|---|---|---|
| 800 | 000 | Dear |
| 801 | 001 | Dea r |
| 802 | 010 | De ar |
| 803 | 011 | De a r |
| 804 | 100 | D ear |
| 805 | 101 | D ea r |
| 806 | 110 | D e ar |
| 807 | 111 | D e a r |

DOCUMENT MANAGEMENT APPARATUS

FIELD OF THE INVENTION

The present invention relates to an apparatus capable of comprehensively managing documents and easily reusing stored data by storing and searching application data created by a personal computer and image data read by a scanner.

BACKGROUND OF THE INVENTION

Along with recent spread of computers, materials used in the office are created by an application program such as a wordprocessor or spreadsheet software installed in a computer. Generally, application data created by the application program is printed by a printer, the printed material is copied by a necessary number, and the copies are distributed at a meeting or the like.

Distributed materials are bound and saved by a binder or the like, or managed by an electronic filing apparatus.

In some cases, application data are managed by a common file server or database software to share information.

Printed materials to be distributed are often copies of a material which is printed first. Also, a distributed material is often copied and redistributed.

Repetitive copying degrades the image quality, resulting in a poor image.

When a color original is distributed, it is copied in monochrome at a very low image quality in most cases because a color copying machine is expensive and is not popular.

To cite part of a distributed paper original and newly reuse it as computer data, the image is read by a scanner and processed as an image. Alternatively, the read image is read by an OCR to extract character data.

However, when an original is processed as an image, the data amount greatly increases. It becomes difficult to process the image and correct part of the image.

Also when character data is extracted by an OCR, problems occur such that correct character data cannot be obtained due to an error, even if characters are correctly recognized, the font type and size cannot be reproduced, or the layout information is lost.

Data can be easily reused by acquiring application data managed by a file server or database. For data which is not stored in the file server or database by the user himself, the user does not know the name and search parameter with which the data is stored, and can hardly acquire the data.

SUMMARY OF THE INVENTION

The present invention has been made to overcome the conventional drawbacks, and provides an apparatus which manages both application data and image data in a database, and when data is to be transmitted using a transfer protocol such as Email or FTP, can transmit application data reusable by a computer.

The present invention also provides an apparatus which transmits a high-quality original image free from any degradation of the image quality when data is to be transmitted using a transfer protocol such as FAX or IFAX which can transmit only an image, or even when an image read by a scanner or an image received by a FAX or IFAX is to be transmitted.

According to the present invention, a document apparatus which manages image data comprises:
  image loading means;
  image printing means;
  database management means for managing data;
  transmission means for transmitting data to a FAX or a network;
  registration means for registering, in the database management means in accordance with database registration information, both application data created by an application of a computer and image data which is created from the application data and formed from each page;
  distribution material creation means for creating and printing a distribution material serving as an image obtained by composing the database registration information and the image data;
  database registration information acquisition means for, when transmission of the distribution material is designated, reading the distribution material by the image loading means, and extracting and reproducing the database registration information printed on the distribution material;
  selection means for selecting the image data when transmission dedicated to image data is selected, and selecting the application data when transmission capable of transmitting data in addition to image data is selected; and
  transmission means for transmitting data selected by the selection means by searching a database by using the reproduced database registration information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which:

FIG. 8 is a view for explaining a distribution material;

FIG. 17 is a view for explaining a distribution material in the third embodiment; and FIG. 18 is a table for explaining the character string of a distribution material in the fourth embodiment.

DETAILED DESCRIPTION OF THE PREFERRED EMBODIMENTS

Preferred embodiments of a document management apparatus according to the present invention will be described with reference to the accompanying drawings.

First Embodiment

Figure 1:
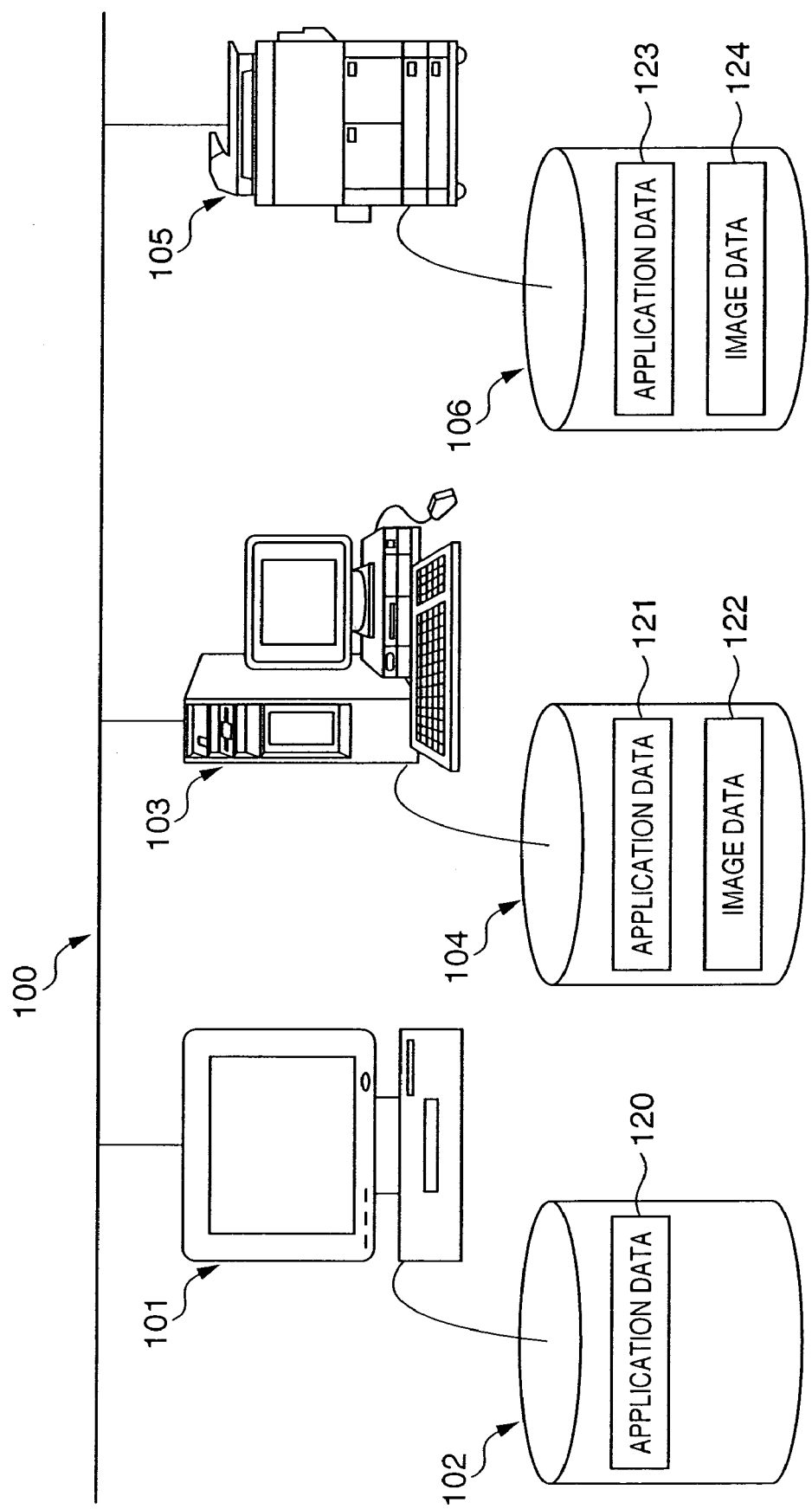
FIG. 1 is a view showing the overall system configuration.

FIG. 1 is a view for explaining the first embodiment.

A PC 101 is a personal computer in which a wordprocessor, spreadsheet software, electronic mail software, and the like run. The PC 101 is connected to a large-capacity disk 102 which stores application programs such as a wordprocessor and spreadsheet software, application data 120 created by an application, an operating system for activating a computer, and a printer driver for creating printer data.

The PC 101 is connected to a LAN 100, and can print, by a printer on a network, data created by the operating system, application, and printer driver.

A multifunction copying machine 105 has COPY, FAX, and network printer functions, and is connected to the LAN 100. In addition to the COPY, FAX, and network printer functions, the multifunction copying machine 105 has a SEND function of sending image data read by a scanner to a PC on the network, and an Internet FAX (to be simply referred to as IFAX hereinafter) function of transmitting/receiving image data via the network.

When the PC 101 is to print the application data 120 by using the network printer function of the multifunction copying machine 105, a corresponding application is activated in the PC 101. The application invokes a printer driver which is installed in the PC 101 and corresponds to the multifunction copying machine 105. The application creates PDL (Page Description Language) data, and transmits the PDL data to the multifunction copying machine 105.

Upon receiving the PDL data, the multifunction copying machine 105 rasterizes an image from the PDL data, and prints the created image by the printer.

A document management server 103 is connected to the LAN 100, and manages application data 121 stored in a large-capacity disk 104 and image data 122 created from the application data 121 in association with each other.

The image data 122 is data in an image format of each page from the application data 121. The image data 122 may be TIFF (Tag Image File Format) data, PDF (Portable Document Format) data, or PDL (Page Description Language) data such as PostScript data.

The multifunction copying machine 105 also has a document management server function, and a large-capacity disk 106 stores application data 123 and image data 124.

Detailed operation of the document management server function will be described later.

Figure 2:
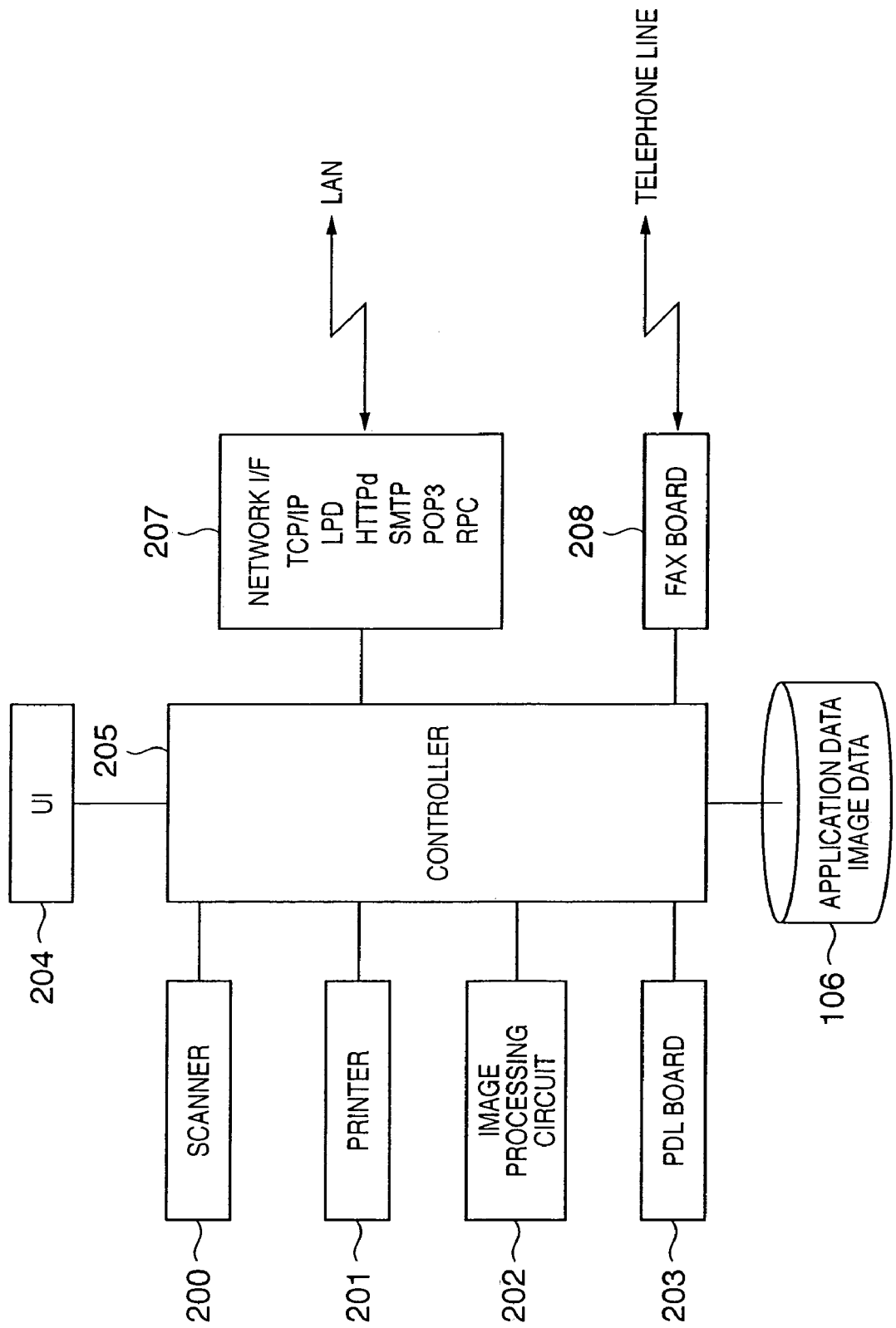
FIG. 2 is a block diagram showing the system configuration of a multifunction copying machine.

FIG. 2 is a block diagram showing the configuration of the multifunction copying machine 105.

A scanner 200 is equipped with a document feeder. The document feeder sequentially feeds an original page by page from the first page to a platen glass, and discharges the original from the platen glass after the end of original reading operation.

When an original is fed onto the platen glass, the lamp is turned on to start moving a scanner unit. The original is exposed and scanned by movement of the scanner unit. Light reflected by the original in exposure/scanning is guided to a CCD image sensor via a mirror and lens. The image of the scanned original is read by the CCD image sensor. The CCD image sensor photoelectrically converts the optically read image into image data, and outputs the image data.

A printer 201 inputs the image data output from the scanner 200 to a laser driver. The laser driver drives a laser-emitting unit on the basis of the input image data. The laser-emitting unit emits a laser beam corresponding to the input image data. The laser beam scans and irradiates a photosensitive drum, forming an electrostatic latent image corresponding to the laser beam on the photosensitive drum.

The electrostatic latent image on the photosensitive drum is visualized as a developer image with a developer supplied from a developing unit. A printing sheet is fed from a printing sheet cassette at the timing synchronized with the start of irradiation of the laser beam. The printing sheet is conveyed between the photosensitive drum and a transfer unit. The developer image formed on the photosensitive drum is transferred onto the fed printing sheet by the transfer unit.

The printing sheet bearing the developer image is conveyed to a fixing unit, which presses the printing sheet by heat to fix the developer image onto the printing sheet. The printing sheet having passed through the fixing unit is discharged by a discharge roller.

When a sorter is mounted, discharged printing sheets are stored in respective bins and sorted by the sorter.

An image processing circuit 202 performs various image processes such as a trimming process, and image scaling such as image enlargement/reduction. Also, the image processing circuit 202 compresses image data into encoded data such as MH, MR, MMR, JBIG, or JPEG data, and decompresses encoded data into image data.

A UI 204 is an operation panel which is manipulated by the user in operation and comprised of a liquid crystal display and touch screen. The UI 204 also has hard keys such as a start key, stop key, and ten-key pad.

A PDL board 203 expands PDL data received by a network I/F 207 into image data printable by the printer 201.

A FAX board 208 performs FAX transmission/reception. The FAX board 208 is comprised of an NCU (Network Control Unit) which switches between the telephone and the FAX, detects a ringing signal upon reception, and holds a DC loop signal from a telephone exchange during speech communication, a MODEM (MOdulator/DEModulator) serving as a modulation/demodulation circuit which converts an analog signal into a digital signal and converts a digital signal into an analog signal, an image processing circuit, and the like.

The network I/F 207 is a circuit for connecting a LAN. As the program structure, the network I/F 207 includes application programs such as a network layer TCP/IP formed from IP (Internet Protocol), TCP (Transmission Control Protocol), and UDP (User Datagram Protocol) of the network layer, a file transfer service FTP (File Transfer Protocol), a printer printing server protocol LPD (Line Printer Daemon), a WWW (World Wide Web) server protocol HTTPd (Hypertext Transfer Protocol daemon), an electronic mail transmission/reception protocol SMTP (Simple Mail Transfer Protocol), a mail download protocol POP3 (Post Office Protocol-Version 3), and RPC (Remote Procedure Call) serving as a function of calling a subroutine present in a remote system via a network.

To copy, the user sets an image processing method including the number of copies and trimming designation via the UI 204. When the user presses the start key, a controller 205 receives a copying start instruction and drives the scanner 200.

The controller 205 controls the image processing circuit 202 and printer 201 so as to perform an image process for image data from the scanner 200 by the image processing circuit 202 and execute printing operation by the printer 201 for the signal having undergone the image process.

In FAX transmission, image data read by the scanner 200 is input to the FAX board 208 via the image processing circuit 202.

The FAX board 208 operates circuits such as the MODEM and NCU, and communicates with a transmission destination. The FAX board 208 scales the image in accordance with the receiver performance, encodes the image, and transmits the image data.

In FAX reception, data is received by the NCU, and converted into a digital signal by the MODEM. The controller 205 operates to encode the data again by the image processing circuit and print the data by the printer 201.

When the application data 120 is to be printed from the PC 101, the printer driver installed in the PC 101 creates PDL data and transmits it to the multifunction copying machine 105 by LPR (Line Printer Request).

The multifunction copying machine 105 receives the PDL data by the LPD of the network I/F 207, and creates rasterized image data by the PDL board 203. The controller 205 controls-to print the rasterized image data by the printer 201, thereby executing printing of the application data.

Figure 3:
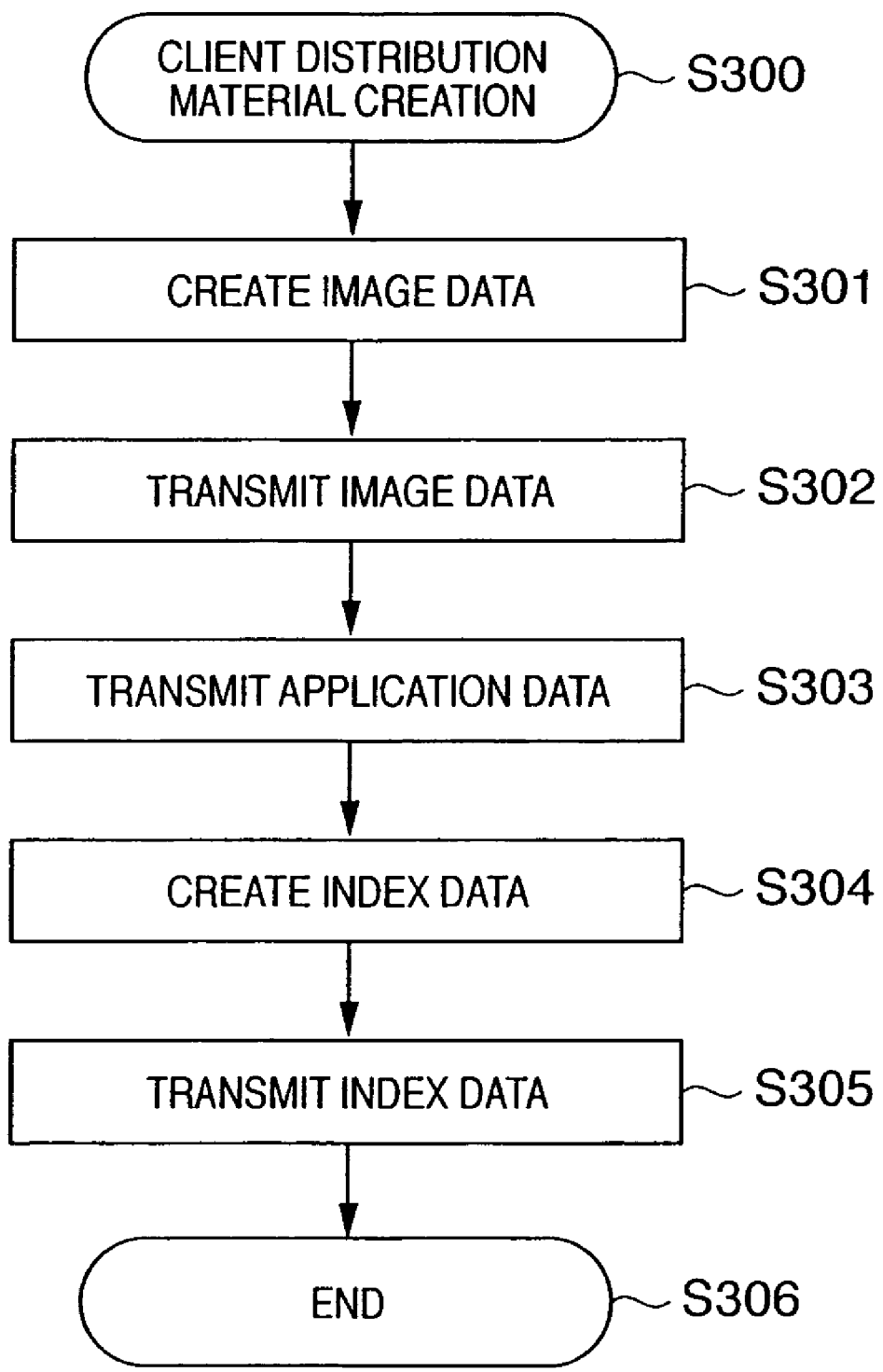
FIG. 3 is a flowchart showing the processing sequence of client distribution material creation executed in a client PC.

FIG. 3 is a flowchart for explaining the operation of the PC 101 when the PC 101 registers application data in the document management server of the multifunction copying machine 105 to print a distribution material.

A client distribution material creation program S300 is activated in the PC 101 in accordance with a user instruction. An image data creation routine S301 is invoked to create, from the application data 120 by using the printer driver function, image data of the PDF file format formed by data of pages.

The generated image data is also transmitted to the multifunction copying machine 105 (S302), and the application data 120 as generation source data of the image data is transmitted to the multifunction copying machine 105 (S303).

The transmitted image data and application data are stored in the database of the multifunction copying machine 105. Index data capable of managing and searching for these data is created (S304), the created index data is transmitted (S305), and the process ends (S306).

Data transmission in S302, S303, and S305 is implemented by the RPC protocol.

Figure 4:
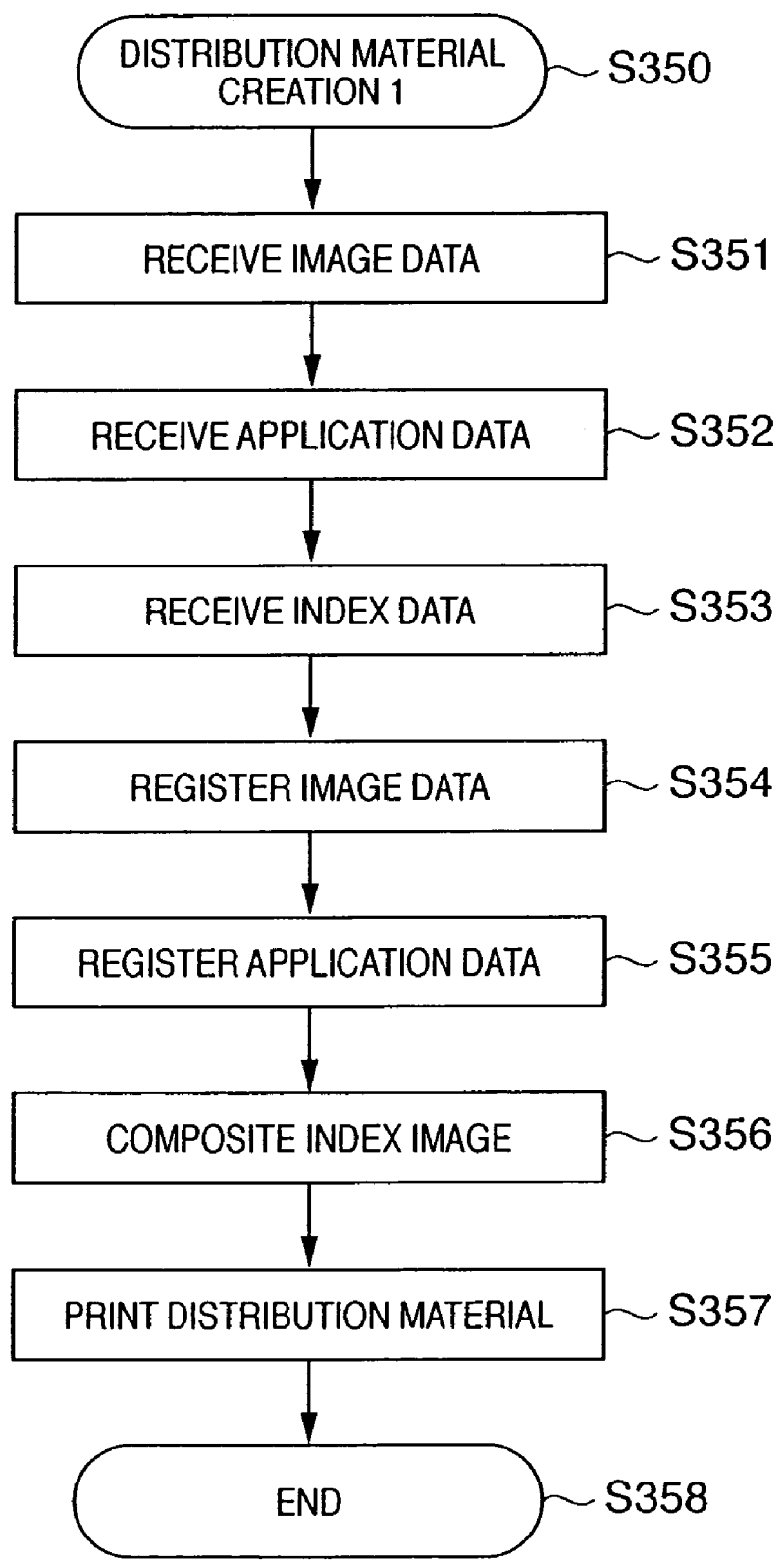
FIG. 4 is a flowchart showing the processing sequence of distribution material creation 1 in which data is received from the client PC to create a distribution material in the first embodiment.

FIG. 4 is a flowchart for explaining the operation of the multifunction copying machine 105 which has received image data and application data from the PC 101. This process is executed in the process of distribution material creation 1 (S350).

The multifunction copying machine 105 receives image data transmitted by the PC 101 in S302 (S351), and receives application data transmitted in S303 (S352).

Index data for document management of the received data is received (S353).

Upon reception of the index data, the image data is registered as the image data 124 in the database of the large-capacity disk 106 (S354), and the application data is registered as the application data 123 in the database (S355). The index data associates the image data and application data with each other, and allows searching the database for them.

The index data received in S353 is converted into barcode image data, and the barcode image data is composited with the received image data (S356).

The barcode data uses a QR code serving as a two-dimensional barcode which can contain a large amount of data and has an error correction function.

The barcode data is not limited to the QR code, and may be a one-dimensional code such as JAN, standard ITF, CODE-128, CODE39, or NW-7, or a two-dimensional barcode such as PDF417, DataMatrix, MaxiCode, VeriCode, or CODE49.

The data created by compositing the barcode data and original image data serves as a distribution material. The distribution material is printed (S357), and the process ends (S358).

The distribution material can be printed by a necessary number of copies. The distribution material is printed by the number of copies necessary for a meeting or the like, distributed, and used.

The distribution material will be explained later with reference to FIG. 8.

Figure 5:
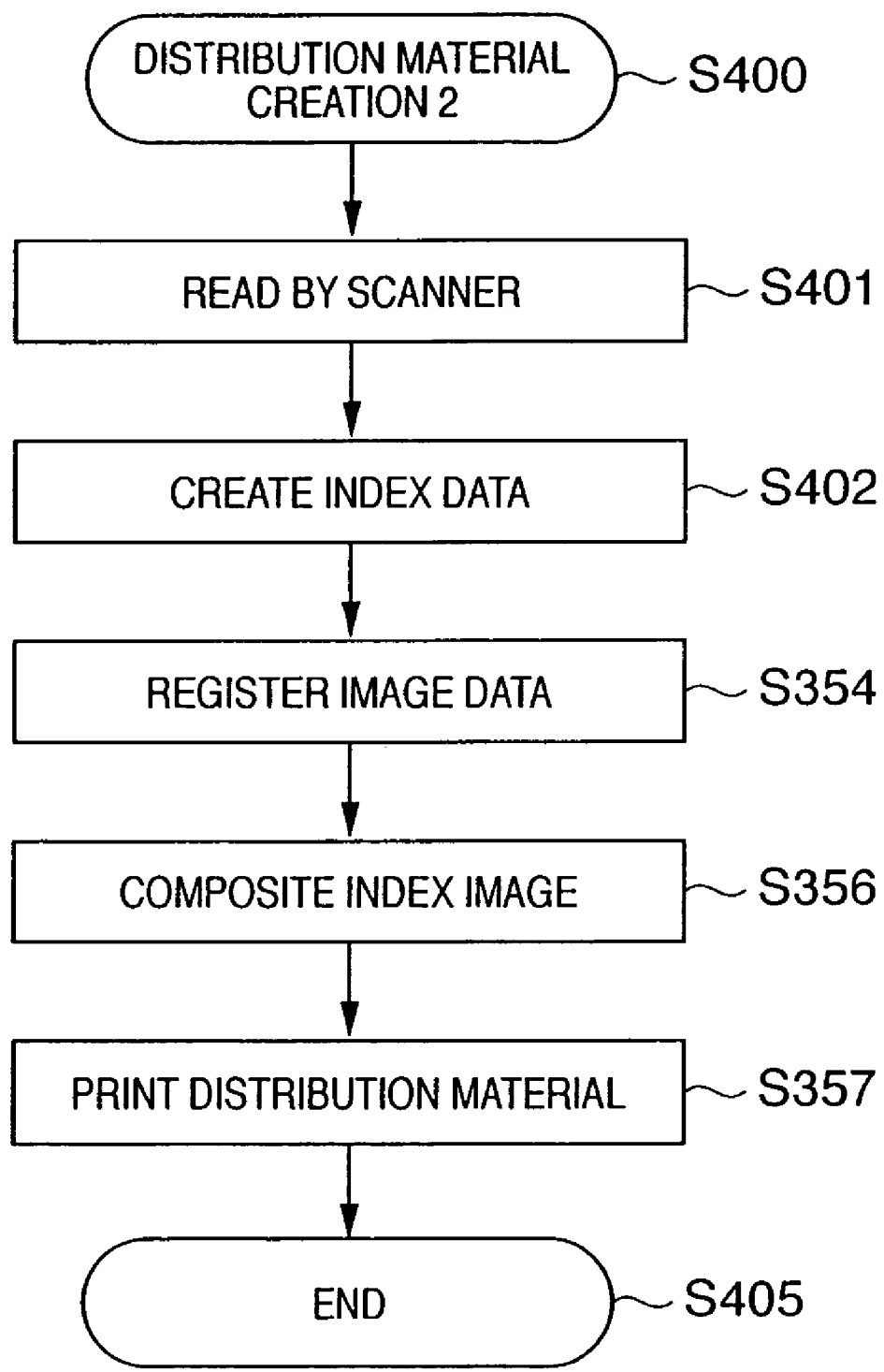
FIG. 5 is a flowchart showing the processing sequence of distribution material creation 2 in which a distribution material is created from data read by a scanner in the first embodiment.

FIG. 5 is a flowchart when a text present as paper data is loaded as an image by the scanner 200 to create a distribution material. This process is executed in distribution material creation 2 (S400).

An original is set on the document feeder of the scanner 200 and converted into image data, and the image data is loaded (S401).

An index data creation process S402 is invoked, and the read image data is registered as the image data 124 in the large-capacity disk 106 so that the database can be searched for the image data read by the scanner 200 (S354).

Index data created in S402 is converted into barcode image data, and the barcode image data is composited with the image data read by the scanner 200 (S356). The composited image data serves as a distribution material, the created distribution material is printed (S357), and the process ends (S405).

Figure 6:
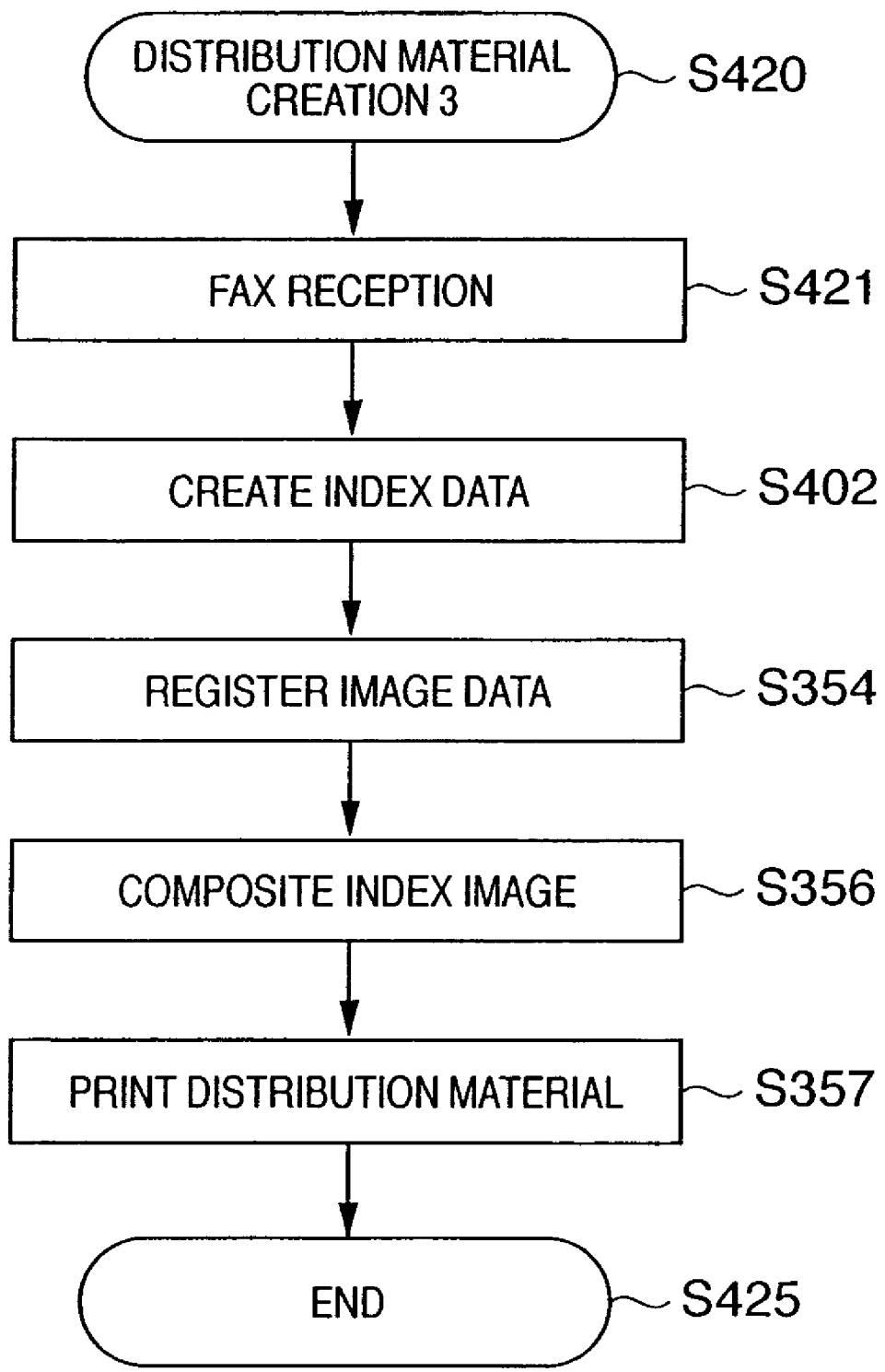
FIG. 6 is a flowchart showing the processing sequence of distribution material creation 3 in which a distribution material is created from FAX-received data in the first embodiment.

FIG. 6 is a flowchart when a distribution material is created from a text received by the FAX board 208. This process is executed in distribution material creation 3 (S420).

When data arrives at the FAX, the FAX board 208 executes FAX reception (S421), and converts the received data into image data.

The index data creation process S402 is invoked, and the FAX-received image data is registered as the image data 124 in the large-capacity disk 106 so that the database can be searched for the image data created by the FAX board 208 (S354).

Index data created in S402 is converted into barcode image data, and the barcode image data is composited with the FAX-received image data (S356). The composited image data serves as a distribution material, the created distribution material is printed (S357), and the process ends (S425).

Figure 7:
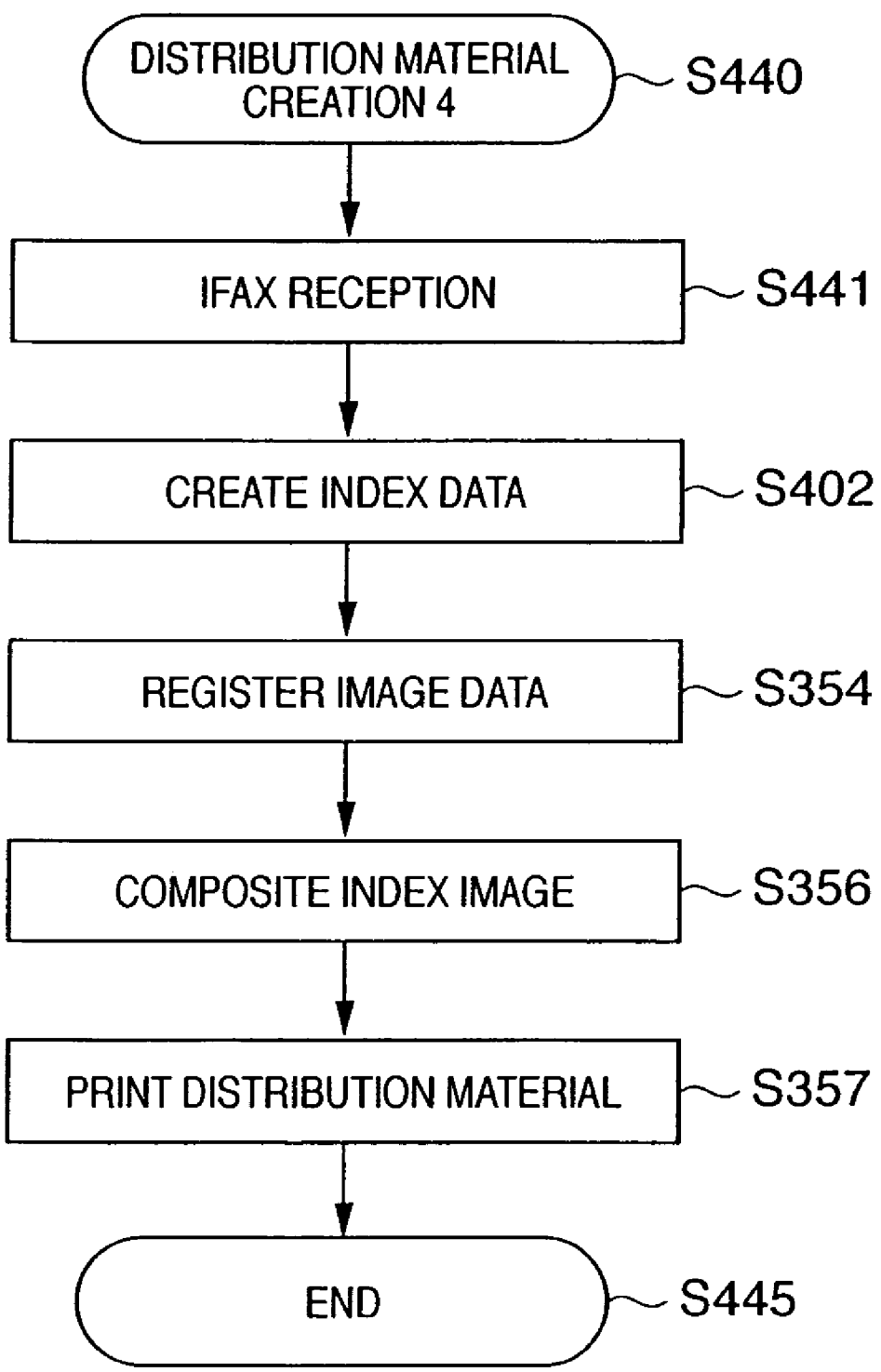
FIG. 7 is a flowchart showing the processing sequence of distribution material creation 4 in which a distribution material is created from IFAX-received data in the first embodiment.

FIG. 7 is a flowchart when a distribution material is created from a text received by the IFAX (Internet FAX). This process is executed in distribution material creation 4 (S440).

When electronic mail with a TIFF file is received by POP3 or SMTP, the TIFF file of the received data is extracted, and Internet FAX reception (S441) is executed.

The index data creation process S402 is invoked, and image data created by IFAX reception is registered as the image data 124 in the large-capacity disk 106 so that the database can be searched for the image data created by IFAX reception (S354).

Index data created in S402 is converted into barcode image data, and the barcode image data is composited with the IFAX-received image data (S356). The composited image data serves as a distribution material, the created distribution material is printed (S357), and the process ends (S445).

FIG. 8 is a view for explaining a distribution material.

An image 450 is an image created by the application of the PC 101, an image read by the scanner 200, a FAX-received image, or an IFAX-received image.

As described above with reference to FIGS. 4 to 7, the image is registered in the database and can be searched for by using index data.

The index data is converted into image data as a QR code 451 serving as a two-dimensional barcode, and printed at the lower right corner of the image 450.

Figure 9:
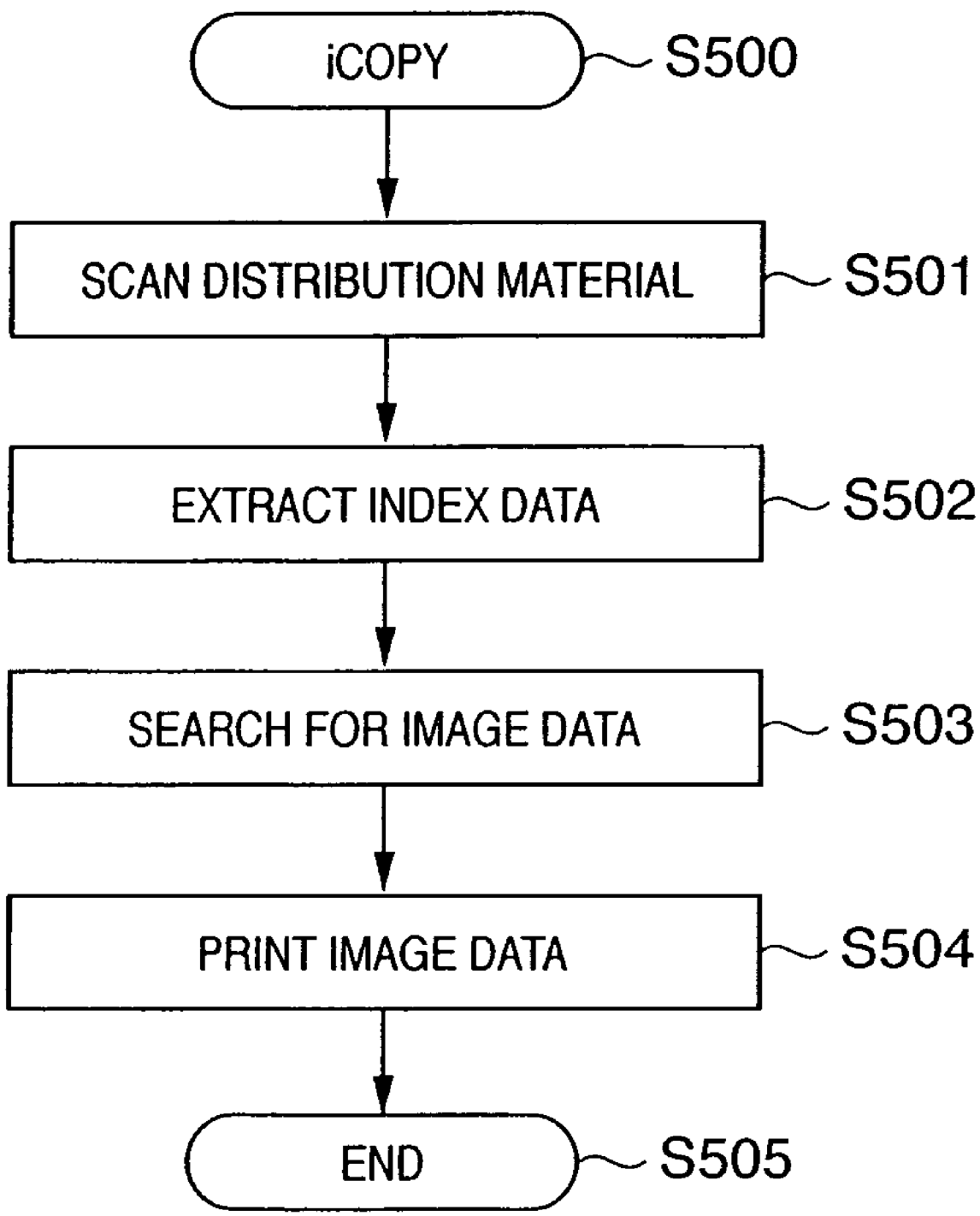
FIG. 9 is a flowchart showing the processing sequence of iCOPY operation in which an original image is printed from a distribution material in the first embodiment.

FIG. 9 is a flowchart for explaining iCOPY operation of searching for an original image registered in the database on the basis of a material distributed at a meeting or the like and printing the original image.

The distribution material is not limited to one printed in S357, but may be a distribution material whose image quality is low because the distribution material printed in S357 is repetitively copied, a distribution material which has a memo written by another person, a distribution material punched for binding by a binder or the like, or a distribution material obtained by copying a color distribution material by a monochrome copying machine.

The iCOPY function starts in S500, and a distribution material is scanned by the scanner 200 (S501) to load the image of the distribution material.

The loaded image data is searched for the QR code 451 serving as a two-dimensional barcode. The QR code is analyzed to extract index data (S502).

The database is searched on the basis of the extracted index data for the image data 124 stored in the large-capacity disk 106 (S503). The acquired image data is printed (S504), and the process ends.

Unlike a distribution material whose image greatly degrades, the printed image is an image created by the application of the PC 101, an image which is read by the scanner 200 and registered, or a clear image received by the FAX or IFAX.

Figure 10:
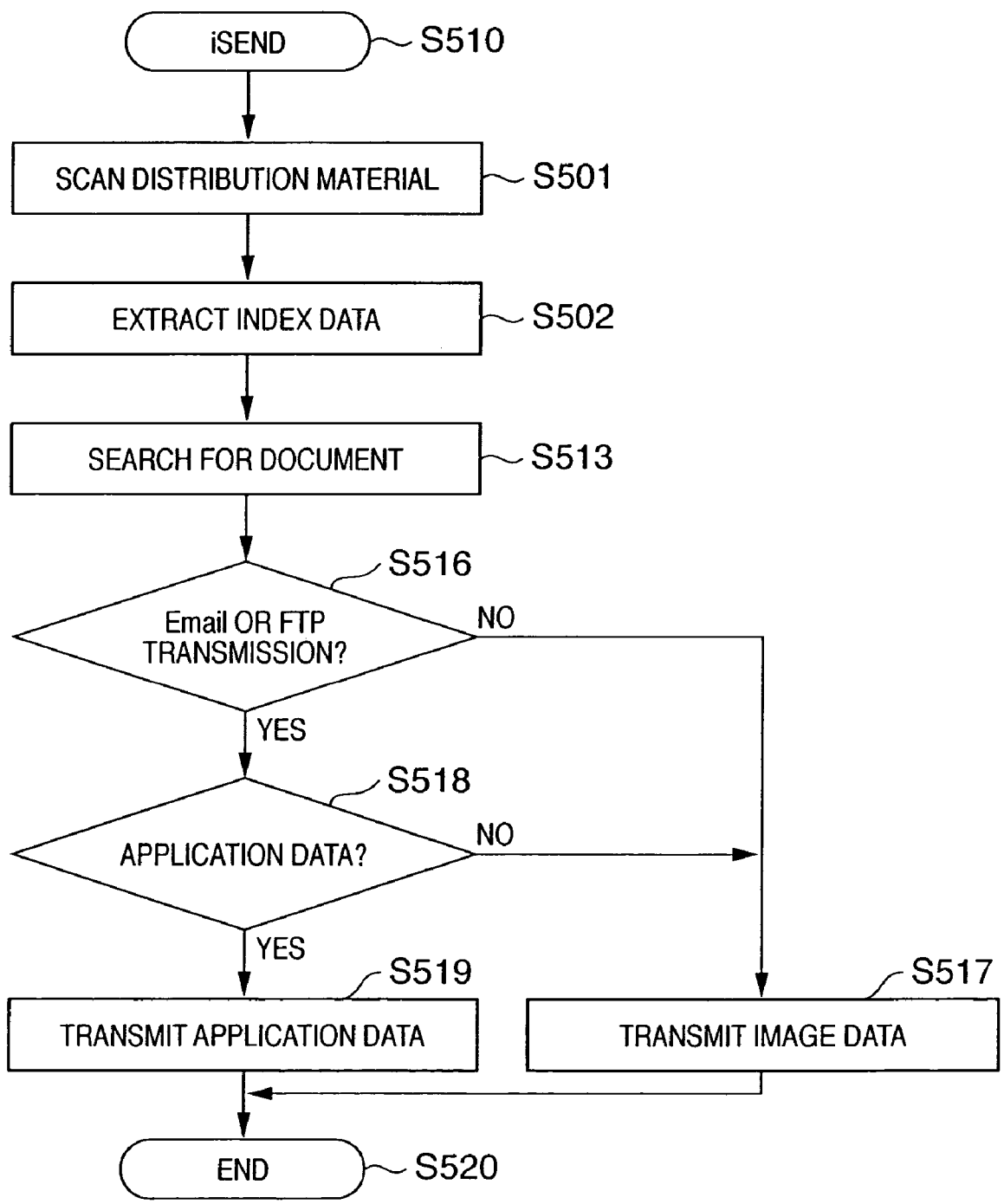
FIG. 10 is a flowchart showing the processing sequence of iSEND operation in which application data is sent from a distribution material in the first embodiment.

FIG. 10 is a flowchart for explaining iSEND operation of searching for an original image registered in the database on the basis of a material distributed at a meeting or the like and sending the original image.

iSEND operations can be classified into FAX transmission and IFAX transmission capable of transmitting only an image, and Email transmission and FTP transmission capable of transmitting not only an image but also any data.

Transmission operations are classified by the transfer protocol and component, and can be selected by the user in transmission.

As described above, the distribution material may be one whose image greatly degrades.

The iSEND function starts in S510, and a distribution material is scanned by the scanner 200 (S501) to load the image of the distribution material.

The loaded image data is searched for the QR code 451 serving as a two-dimensional barcode. The QR code is analyzed to extract index data (S502).

The database is searched on the basis of the extracted index data for a text stored in the large-capacity disk 106 (S513).

If Email or FTP capable of transmitting not only an image but also any data is selected in transmission selection in S516, whether application data exists is checked in S518.

If application data exists, it is transmitted (S519).

If transmission other than Email and FTP is selected or even if Email or FTP is selected but no application data exists, the image data is transmitted (S517), and the process ends (S520).

When application data exists, data transmitted by Email or FTP is application data capable of reusing data. The transmission data size decreases, and the transmission rate increases.

Also in image data transmission, the transmission image is not image data whose image degrades, like a distribution material. A high-quality scanned or received original image can be transmitted.

Second Embodiment

Figure 11:
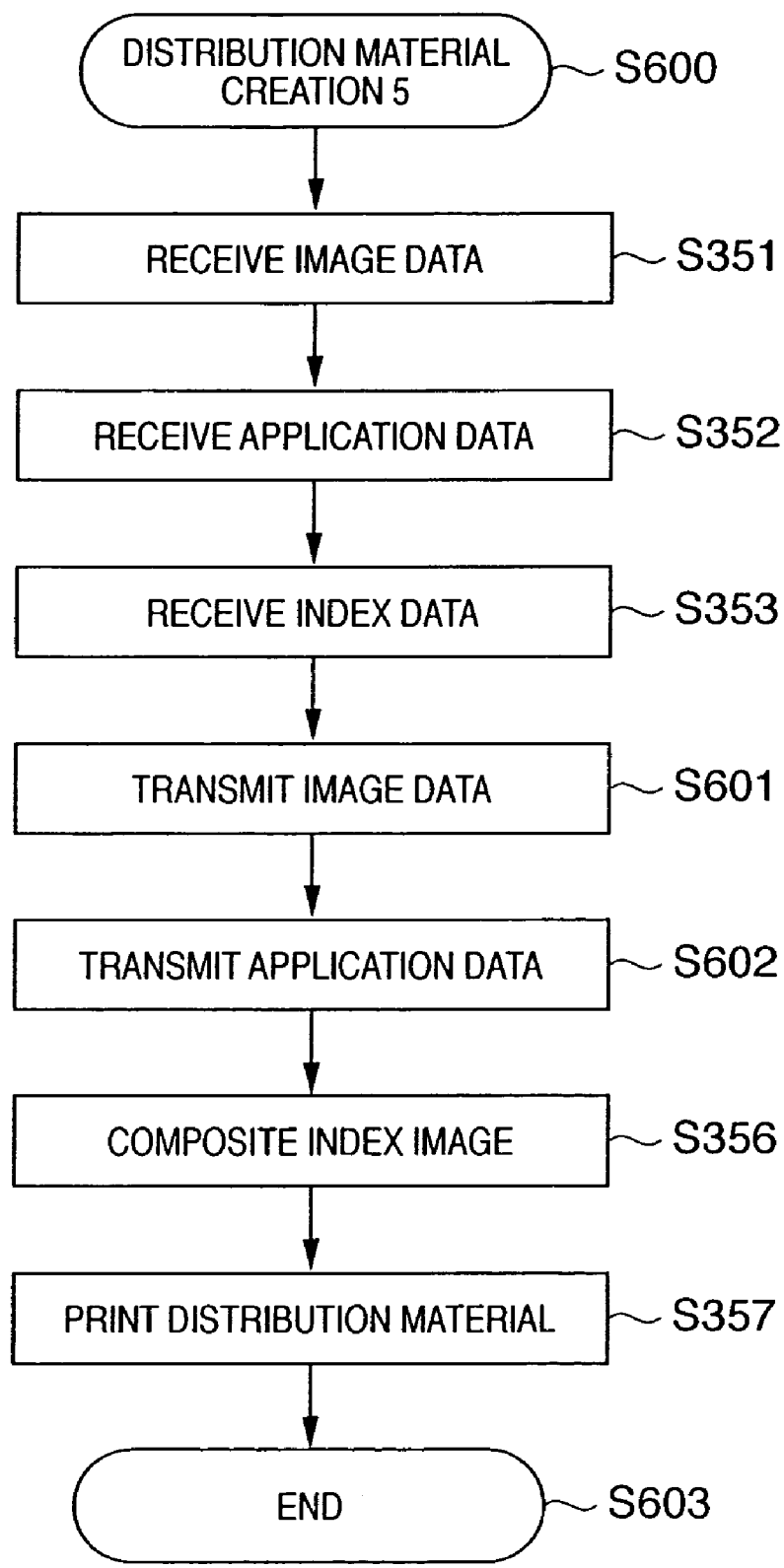
FIG. 11 is a flowchart showing the processing sequence of distribution material creation 5 in which data is received from the client PC to create a distribution material in the second embodiment.

FIG. 11 shows a process of managing data by using a document management server 103 according to the second embodiment of the present invention.

The capacity of a large-capacity disk 104 can be easily increased in comparison with the use of the document management server of a multifunction copying machine 105 which has a spatial limitation. In backup of data, a backup medium can be easily exchanged.

As described above with reference to FIG. 3, when a PC 101 transmits image data serving as a PDF file, application data, and index data to the multifunction copying machine 105, the multifunction copying machine 105 starts the process of distribution material creation 5 (S600).

Image data transmitted by the PC 101 in S302 is received (S351), application data transmitted in S303 is received (S352), and index data transmitted in S305 is received (S353).

Index data for registering the received data in the database of the document management server 103 which manages documents is created (S402). The index data associates the image data and application data with each other, and allows searching the database for them.

After the index data is created, the image data is transmitted to the document management server 103 (S601), and the application data is also transmitted to the document management server 103 (S602).

The transmitted image data and application data are stored in the document management server, and managed as image data 122 and application data 121 in the database of the large-capacity disk 104.

The index data received in S353 is converted into barcode image data, and the barcode image data is composited with the received image data (S356).

The barcode data uses a QR code serving as a two-dimensional barcode which can store a large amount of data and has an error correction function.

The data created by compositing the barcode data and original image data serves as a distribution material described with reference to FIG. 8. The distribution material is printed (S357), and the process ends (S603).

The distribution material can be printed by a necessary number of copies. The distribution material is printed by the number of copies necessary for a meeting or the like, distributed, and used.

Figure 12:
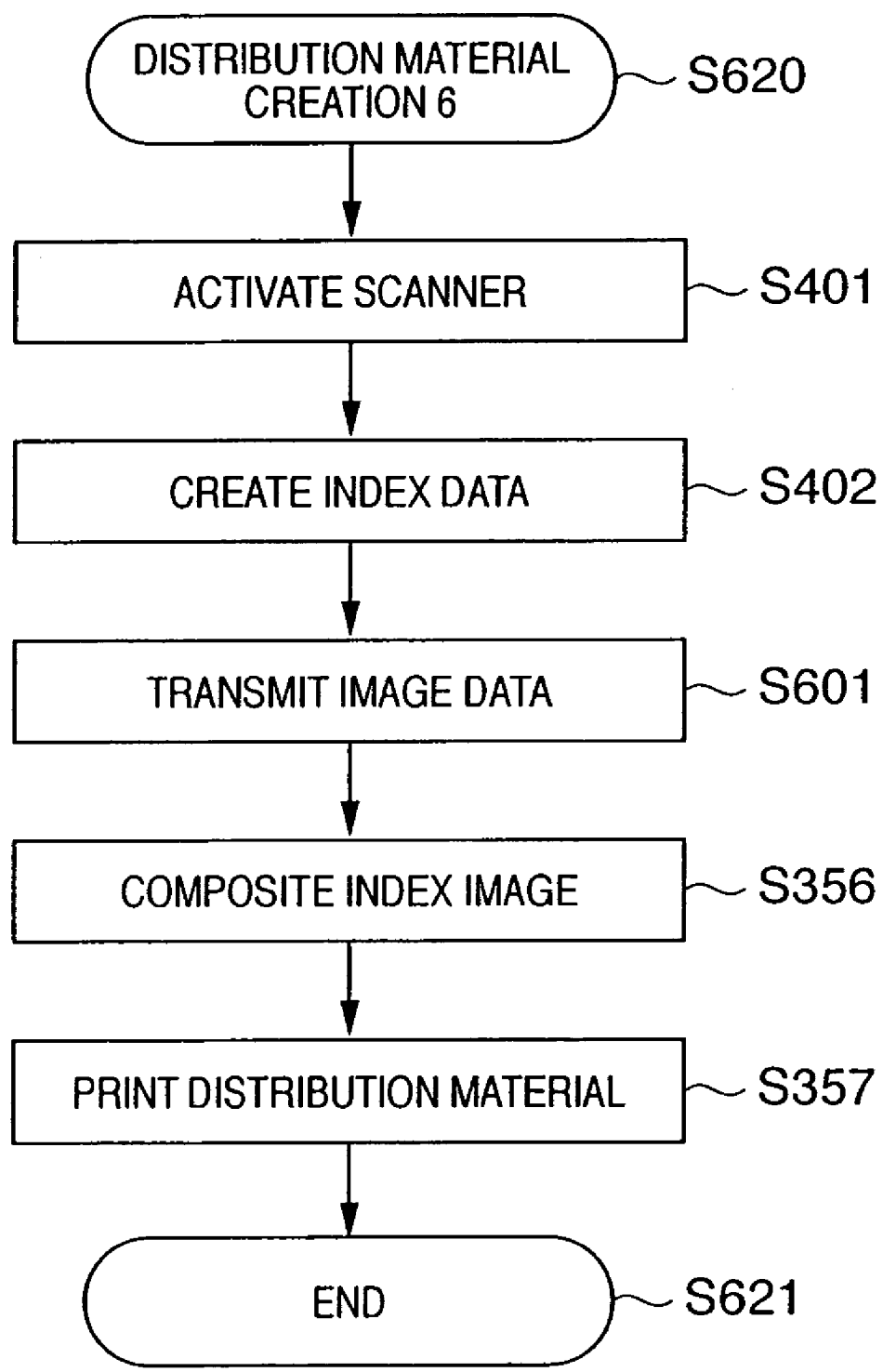
FIG. 12 is a flowchart showing the processing sequence of distribution material creation 6 in which a distribution material is created from data read by the scanner in the second embodiment.

FIG. 12 is a flowchart when a text present as paper data is loaded as an image by a scanner 200 to create a distribution material. This process is executed in distribution material creation 6 (S620).

An original is set on the document feeder of the scanner 200 and converted into image data, and the image data is loaded (S401).

The index data creation process S402 is invoked, and the image data read by the scanner 200 is transmitted to the document management server 103 (S601).

The document management server receives the image read by the scanner, and manages it as the image data 122 in the database of the large-capacity disk 104.

Index data created in S402 is converted into barcode image data, and the barcode image data is composited with the image data read by the scanner 200 (S356). The composited image data serves as a distribution material, the created distribution material is printed (S357), and the process ends (S621).

Figure 13:
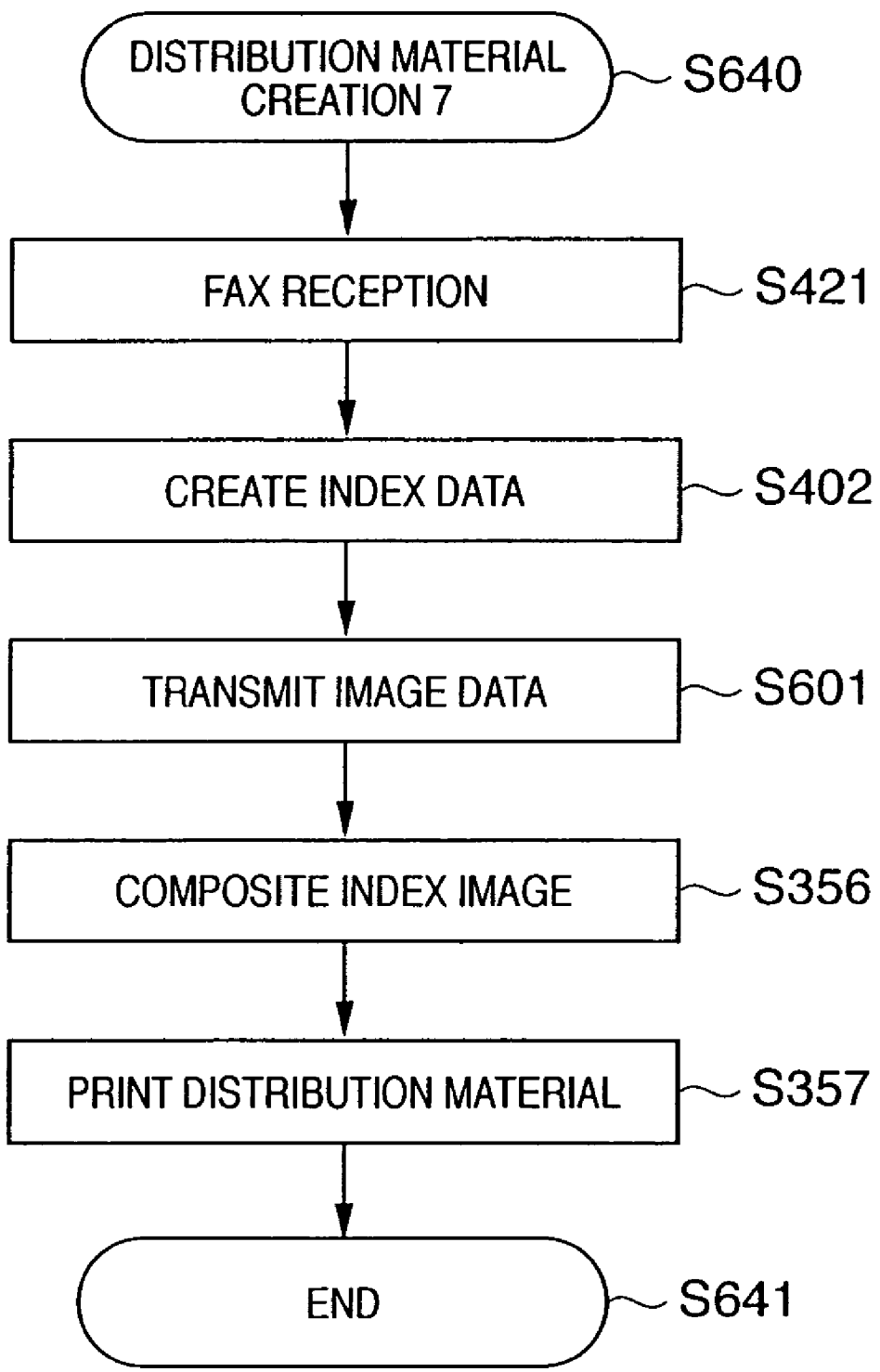
FIG. 13 is a flowchart showing the processing sequence of distribution material creation 7 in which a distribution material is created from FAX-received data in the second embodiment.

FIG. 13 is a flowchart when a distribution material is created from a text received by a FAX board 208. Distribution material creation 7 (S640) is activated.

When data arrives at the FAX, the FAX board 208 executes FAX reception (S421), and converts the received data into image data.

The index data creation process S402 is invoked, and the image data created by the FAX board 208 is transmitted to the document management server 103. (S601).

The document management server receives the FAX-received image, and registers it as the image data 122 in the database of the large-capacity disk 104. The registered FAX-received image can be searched for by the document management server.

Index data created in S402 is converted into barcode image data, and the barcode image data is composited with the FAX-received image data (S356). The composited image data serves as a distribution material, the created distribution material is printed (S357), and the process ends (S641).

Figure 14:
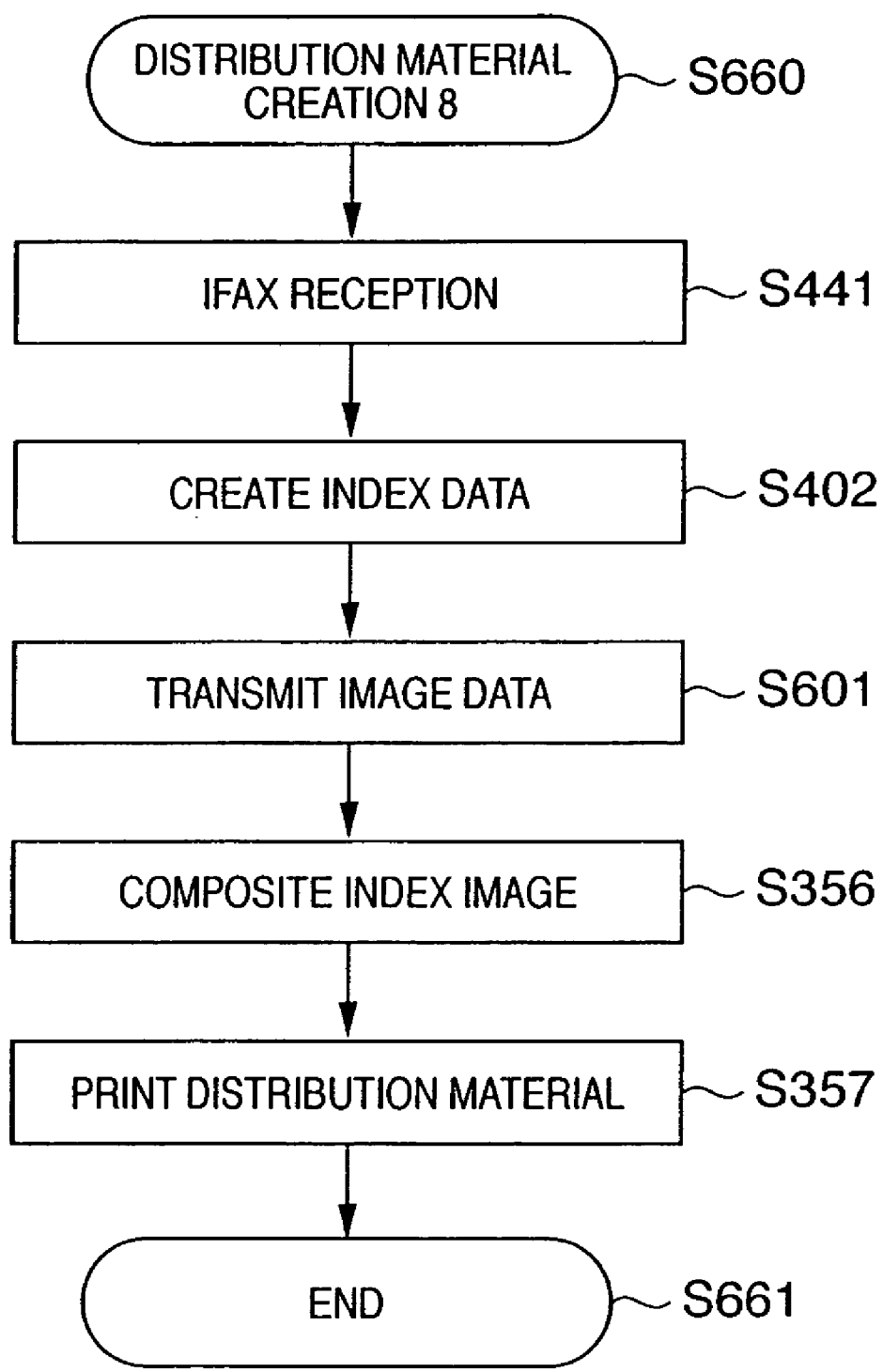
FIG. 14 is a flowchart showing the processing sequence of distribution material creation 8 in which a distribution material is created from IFAX-received data in the second embodiment.

FIG. 14 is a flowchart when a distribution material is created from a text received by the IFAX (Internet FAX). This process is executed in distribution material creation 8 (S660).

When electronic mail with a TIFF file is received by POP3 or SMTP, the TIFF file of the received data is extracted, and Internet FAX reception (S441) is executed.

The index data creation process S402 is invoked, and image data created by IFAX reception is transmitted to the document management server 103 (S601), and registered in the database of the document management server 103. The registered IFAX-received image is registered as the image data 122 in the large-capacity disk 104, and can be searched for by the document management server.

Index data created in S402 is converted into barcode image data, and the barcode image data is composited with the IFAX-received image data (S356). The composited image data serves as a distribution material, the created distribution material is printed (S357), and the process ends (S661).

Figure 15:
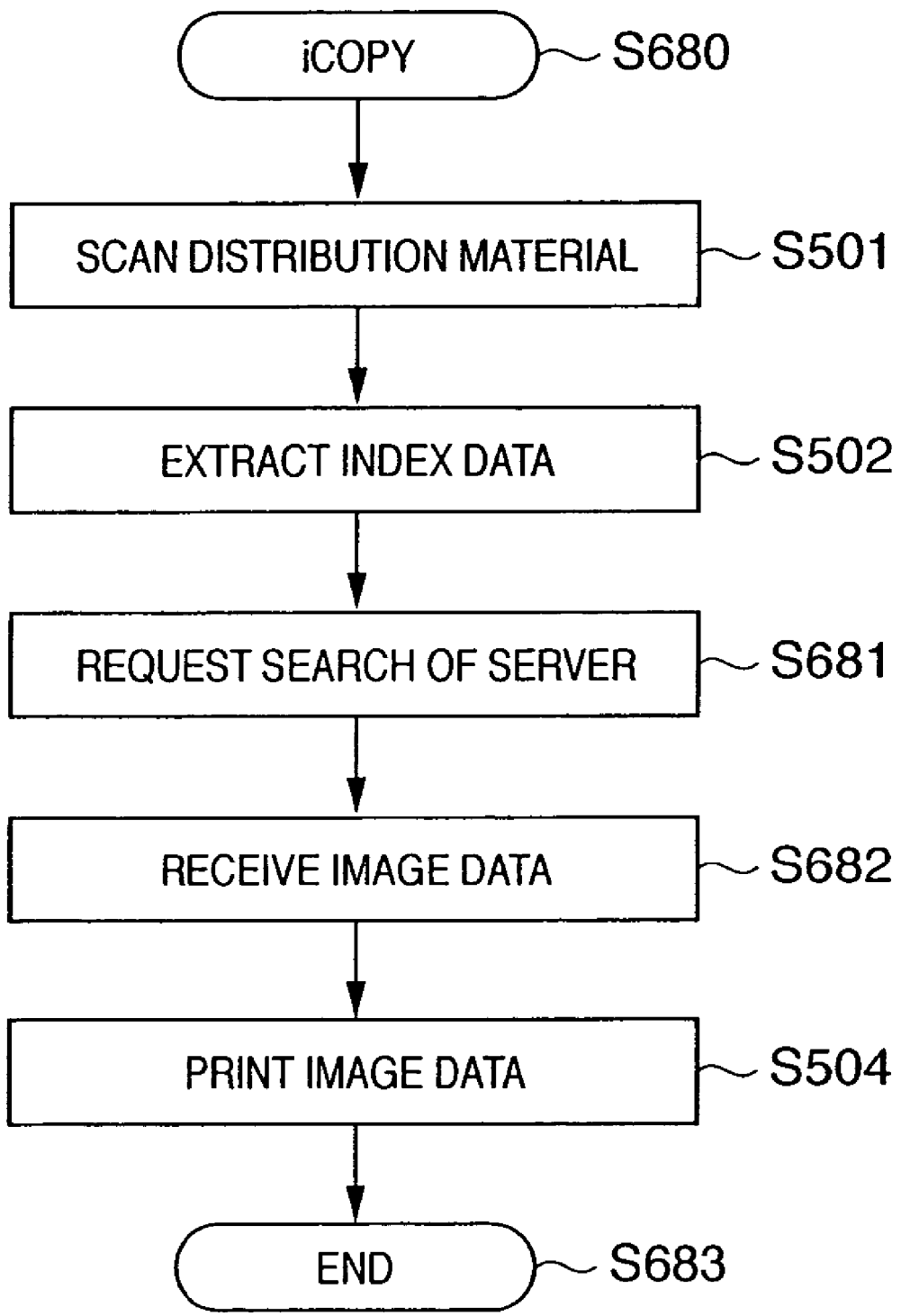
FIG. 15 is a flowchart showing the processing sequence of iCOPY operation in which an original image is printed from a distribution material in the second embodiment.

FIG. 15 is a flowchart for explaining iCOPY operation of searching for an original image registered in the database on the basis of a material distributed at a meeting or the like and printing the original image.

The distribution material is not limited to one printed in S357, but may be a distribution material whose image quality is low because the distribution material printed in S357 is repetitively copied, a distribution material which has a memo written by another person, a distribution material punched for binding by a binder or the like, or a distribution material obtained by copying a color distribution material by a monochrome copying machine.

The iCOPY function starts in S680, and a distribution material is scanned by the scanner 200 (S501) to load the image of the distribution material.

The loaded image data is searched for a QR code 451 serving as a two-dimensional barcode. The QR code is analyzed to extract index data (S502).

The document management server 103 is requested to search the database on the basis of the extracted index data (S681). The document management server 103 searches the large-capacity disk 104 on the basis of the search-requested index data, and transmits corresponding image data 122 to the multifunction copying machine 105.

The multifunction copying machine 105 receives the transmitted image data (S682), and prints the received image data (S504). The process then ends (S683).

Unlike a distribution material whose image greatly degrades, the printed image is an image created by the application of the PC 101, an image which is read by the scanner 200 and registered, or a clear image received by the FAX or IFAX.

Figure 16:
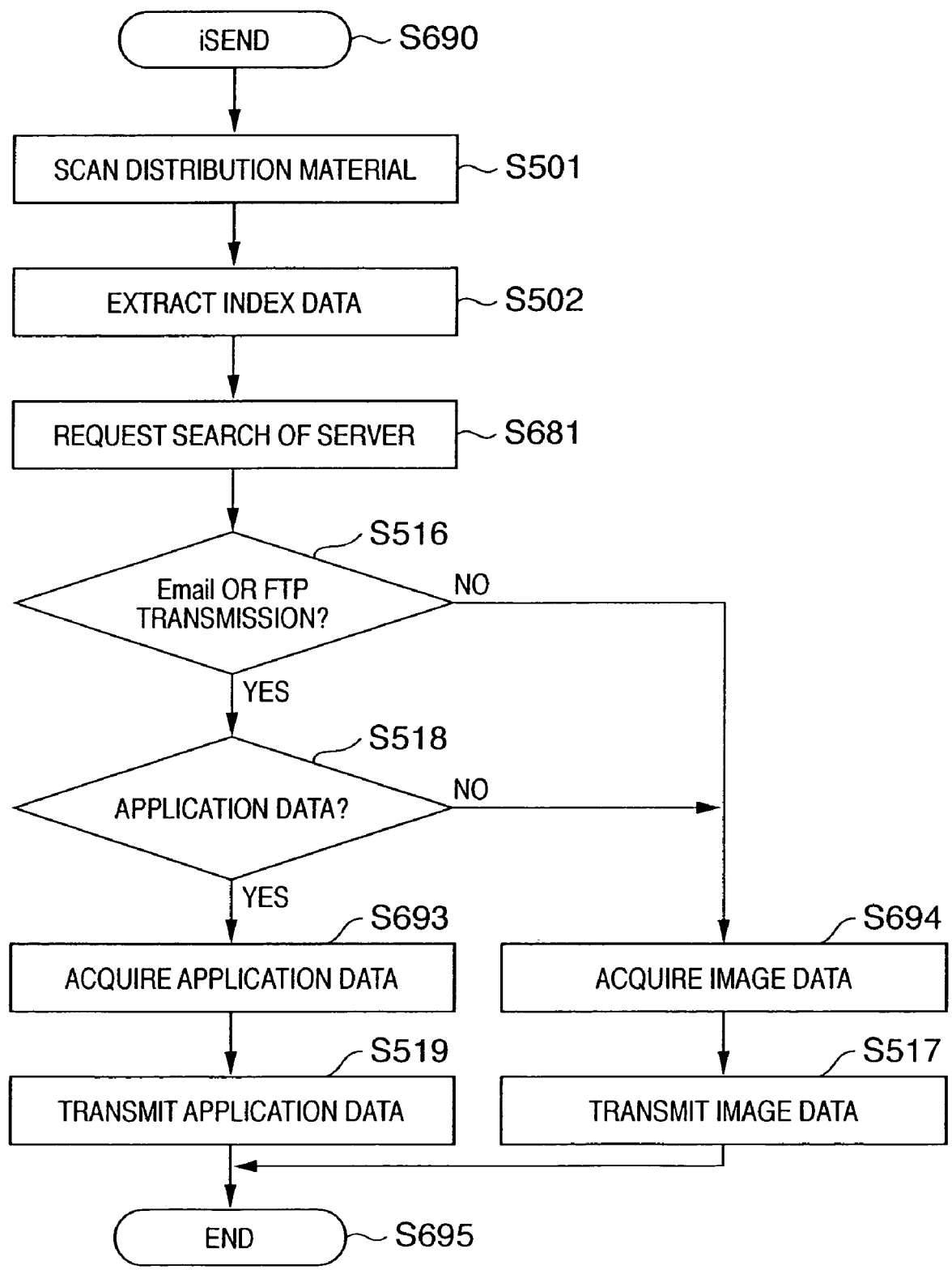
FIG. 16 is a flowchart showing the processing sequence of iSEND operation in which application data is sent from a distribution material in the second embodiment.

FIG. 16 is a flowchart for explaining iSEND operation of searching for an original image registered in the database on the basis of a material distributed at a meeting or the like and sending the original image.

iSEND operations can be classified into FAX transmission and IFAX transmission capable of transmitting only an image, and Email transmission and FTP transmission capable of transmitting not only an image but also any data.

Transmission operations are classified by the transfer protocol and component, and can be selected by the user in transmission.

As described above, the distribution material may be one whose image greatly degrades. The iSEND function starts in S690, and a distribution material is scanned by the scanner 200 (S501) to load the image of the distribution material.

The loaded image data is searched for the QR code 451 serving as a two-dimensional barcode. The QR code is analyzed to extract index data (S502).

The document management server 103 is requested to search the database on the basis of the extracted index data (S681). The document management server 103 searches the large-capacity disk 104 on the basis of the search-requested index data.

If Email or FTP capable of transmitting not only an image but also any data is selected in transmission selection in S516, whether application data exists in the large-capacity disk 104 is checked in S518. If application data exists, it is acquired (S693) and transmitted (S519).

If transmission other than Email and FTP is selected or even if Email or FTP is selected but no application data exists, the image data is acquired (S694) and transmitted (S517), and the process ends (S695).

The multifunction copying machine 105 receives the transmitted application data (S693), and transmits the received application data (S519). The process then ends (S695).

When application data exists, data transmitted by Email or FTP is application data capable of reusing data. The transmission data size decreases, and the transmission rate increases.

Also in image data transmission, the transmission image is not image data whose image degrades, like a distribution material. A high-quality scanned or received original image can be transmitted.

Third Embodiment

FIG. 17 shows a form in which index data is printed as a character string (700) on a distribution material according to the third embodiment of the present invention.

Index data is formed from the name "MY_COPY.abc.co.jp" of a multifunction copying machine which stores data, and the name "/DB/001" of a directory at which application data is stored. The character string 700 "MY_COPY.abc.co.jp/DB/001" is composited and printed on the distribution material.

In iCOPY, an OCR process is executed in the index data extraction process S502. The printed index data "MY_COPY.abc.co.jp/DB/001" is extracted, the database is searched for image data, and the image data is printed.

In iSEND, an OCR process is executed in the index data extraction process S502. The printed index data "MY_COPY.abc.co.jp/DB/001" is extracted, the database is searched for application data, and the application data is sent.

Fourth Embodiment

FIG. 18 is a table for explaining the fourth embodiment of the present invention.

FIG. 18 shows an example in which index information is embedded in an image by widening or narrowing the interval between characters in creating an image file from application data in the image data creation process S301.

When data to be embedded is 000 (800) in creating an image from character data "Dear", the intervals between characters 'D', 'e', 'a', and 'r' are small. When data to be embedded is 001 (801), only the interval between 'a' and 'r' is large, and the intervals between the remaining characters are small.

When data to be embedded is 010 (802), only the interval between 'e' and 'a' is large, and the intervals between the remaining characters are small. When data to be embedded is 011 (803), the interval between 'e' and 'a' and that between 'a' and 'r' are large, and the interval between the remaining characters is small. When data to be embedded is 100 (804), only the interval between 'D' and 'e' is large, and the intervals between the remaining characters are small.

When data to be embedded is 101 (805), the interval between 'D' and 'e' and that between 'a' and 'r' are large, and the interval between the remaining characters is small.

When data to be embedded is 110 (806), the interval between 'D' and 'e' and that between 'e' and 'a' are large, and the interval between the remaining characters is small.

When data to be embedded is 111 (807), the intervals between all the characters are large.

As the character string to be printed becomes longer, the information amount to be embedded becomes larger. Index data can be embedded in a printing image.

In iCOPY, embedded index data is extracted from the interval between the characters of an image in the index data extraction process S502. The database is searched for image data, and the image data is printed.

In iSEND, embedded index data is extracted from the interval between the characters of an image in the index data extraction process S502. The database is searched for image data, and the image data is sent.

The same effects can also be obtained not only by changing the character interval but also by changing the character size or font shape.

Effects of Embodiments

According to the embodiments of the present invention, both a printing image file and application file are managed in the database in association with each other. Which of the data is to be transmitted is determined in accordance with the transmission method. When data is to be transmitted using a transfer protocol such as Email or FTP, the application file capable of reusing data can be transmitted.

By transmitting the application file, the data size decreases, and the transmission rate increases.

Even when data is to be transmitted using a transfer protocol such as FAX or IFAX which can transmit only an image, or even when an image read by the scanner or an image received by the FAX or IFAX is to be transmitted, a high-quality original image free from any degradation of the image quality can be transmitted.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2003-317437 filed on Sep. 9, 2003, which is hereby incorporated by reference herein.

What is claimed is:

1. A document management apparatus comprising:
a storage device that stores a database;
first transmission means for transmitting image data;
second transmission means for transmitting data other than the image data;
registration means for registering both application data created by an application of a computer and image data which is created from the application data correlated with database registration information to the database, wherein the image data and the application data are stored in the database concurrently, but independently of each other at different locations in the database;
acquiring means for acquiring, when the database registration information is entered, the application data or the image data in accordance with the entered database registration information from the database;
selection means for selecting said first transmission means or said second transmission means; and
control means for controlling said acquisition means so as to acquire the image data from the database in a case where the database registration information is entered and said selection means selects said first transmission means, and for controlling said acquisition means so as to acquire the application data from the database in a case where the database registration information is entered and said selection means selects said second transmission means, wherein said control means causes said acquiring means to acquire one of the image data and the application data from the database depending on the selection by said selection means, without a designation by a user as to which of the image data and the application data is to be acquired by said acquiring means.

2. The apparatus according to claim 1, wherein said control means controls said acquisition means so as to acquire the image data in a case where said selection means selects said second transmission means but the application data is not in the database.

3. The apparatus according to claim 1, further comprising printing means for printing an image including the database registration information, and reading means for reading the image printed by said printing means, wherein said acquisition means acquire the application data or the image data in accordance with the database registration information by reading the image including the database registration information by said reading means.

4. The apparatus according to claim 1, wherein said first transmission means includes a facsimile transmission or an Internet facsimile transmission.

5. The apparatus according to claim 1, wherein said second transmission means includes an electronic mail transmission or an FTP transmission.

6. A method for transmitting data comprising:
registering both application data created by an application of a computer and image data which is created from the application data correlated with database registration information to a database, wherein the image data and application data are stored in the database concurrently, but independently of each other at different locations in the database;
acquiring, when the database registration information is entered, the application data or the image data in accordance with the entered database registration information from the database;
selecting a first transmission for transmitting image data or a second transmission for transmitting data other than the image data; and
controlling an acquisition of the application data and the image data such that the image data is acquired from the database in a case where the database registration information is entered and the first transmission is selected; and
controlling an acquisition of the application data and the image data such that the application data is acquired from the database in a case where the database registration information is entered and the second transmission is selected,
wherein one of the image data and the application data is acquired from the database depending on whether the first transmission or the second transmission is selected in the selecting step, without a designation by a user as to which of the image data and the application data is to be acquired.

7. A computer readable storage medium for storing a computer executable program, said computer executable program being executable by a computer so as to control the computer to transmit data, said program comprising:
code to register both application data created by an application of a computer and image data which is created from the application data correlated with database registration information to a database, wherein the image data and the application data are stored in the database concurrently, but independently of each other at different locations in the database;
code to acquire, when the database registration information is entered, the application data or the image data in accordance with the entered database registration information from the database;
code to select a first transmission for transmitting image data or a second transmission for transmitting data other than the image data;
code to control an acquisition of the application data and the image data such that the image data is acquired from the database in a case where the database registration information is entered and the first transmission is selected; and
code to control an acquisition of the application data and the image data such that the application data is acquired from the database in a case where the database registration information is entered and the second transmission is selected,
wherein one of the image data and the application data is acquired from the database depending on whether the first transmission or the second transmission is selected, without a designation by a user as to which of the image data and the application data is to be acquired.

* * * * *